United States Patent [19]

Broadley

[11] 4,062,724
[45] Dec. 13, 1977

[54] NUCLEAR CORE DEBRIS COLLECTING TRAY

[75] Inventor: Donald Broadley, Warrington, England

[73] Assignee: United Kingdom Atomic Energy Authority, London, England

[21] Appl. No.: 563,525

[22] Filed: Mar. 31, 1975

[30] Foreign Application Priority Data

Apr. 5, 1974 United Kingdom ............... 15122/74

[51] Int. Cl.² .............................................. G21C 9/00
[52] U.S. Cl. ......................................... 176/38; 176/40; 176/87
[58] Field of Search ........................ 176/37, 38, 40, 87

[56] References Cited

U.S. PATENT DOCUMENTS

| 3,378,452 | 4/1968 | Costes | 176/40 |
| 3,506,540 | 4/1970 | Yevick et al. | 176/87 |
| 3,607,630 | 9/1971 | West et al. | 176/38 |
| 3,664,923 | 5/1972 | Connolly | 176/40 |
| 3,719,556 | 3/1973 | Snyder, Jr. et al. | 176/38 |

OTHER PUBLICATIONS

Transactions ANS, vol. 13, No. 1, June 26, 1970; "Fast Reactor . . . Core Meltdown," Jansen et al., p. 376.

Primary Examiner—Stephen C. Bentley
Assistant Examiner—Ralph Palo
Attorney, Agent, or Firm—Larson, Taylor and Hinds

[57] ABSTRACT

A nuclear reactor construction comprising a fast reactor core submerged in a pool of liquid sodium in a primary vessel. A collecting tray for core debris is submerged in the pool below the core. The collecting tray comprises a base plate constituting a plane tube sheet while the wall of the tray constitutes an annular tube sheet. Coolant conducting tubes are end received in the tube sheets. An internal skirt of the primary vessel overlaps the wall of the tray.

2 Claims, 2 Drawing Figures

NUCLEAR CORE DEBRIS COLLECTING TRAY

BACKGROUND OF THE INVENTION

This invention relates to nuclear reactors and to collecting trays for molten nuclear fuel debris.

In one form of nuclear reactor a nuclear fuel mass constituting a reactor core is submerged within a pool of liquid coolant which serves as a vehicle for the transfer of heat from the reactor core to steam generating equipment. Examples of reactors of this form are the liquid metal cooled fast breeder reactor, boiling and pressurised water reactors. In the event of loss of coolant from the core, or restricted flow of coolant through the core, the nuclear fuel could melt down and fall to the floor of the coolant containing vessel. Because of the high heat content of the fuel debris supplemented by fission produce decay heat and, possibly, by criticality of the nuclear mass, serious damage could be caused to the floor of the vessel and its environment. For a liquid metal cooled fast breeder reactor several proposals have been made for retaining molten fuel debris before it reaches the floor of the vessel one such proposal including the provision of a plurality of layers of collecting trays disposed beneath the core, trays in the upper layers being arranged to overlap trays in the lower layers. However, the trays would be subject to such high heat flux that serious distortion could occur.

SUMMARY OF THE INVENTION

According to the invention, in a nuclear reactor construction comprising a reactor core submerged in a pool of coolant in a containing vessel and a collecting tray for core debris submerged in the pool of coolant below the core and spaced from the floor of the containing vessel, the wall of the vessel has an internal skirt arranged to overlap a peripheral wall of the tray to direct core debris into the tray, and the collecting tray has a plurality of cooling tubes extending between a base plate and the peripheral wall and through which coolant from the lower regions of the pool can be circulated upwardly.

In use, coolant is circulated through the cooling tubes so that the heat flux into the base of the tray is maintained at a tolerable level. Preferably, circulation of coolant through the tubes is by natural convection to provide a completely passive system but, alternatively, the coolant could be pumped through the tubes. The tubes of the complex are arranged to be evenly distributed within the tray so that, in the event of an emergency resulting in melt down of fuel, cooling is substantially uniform throughout the mass of fuel debris. Bends in the tubes provide adequate flexibility to accommodate thermal linear expansion.

The invention also resides in a collecting tray for a nuclear reactor construction according to the preceding paragraph, the collecting tray comprising a base plate in which one open end of each tube of a complex of cooling tubes is received and a peripheral wall in which the other open end of each tube of the complex of cooling tubes is received.

DESCRIPTION OF THE DRAWINGS

Constructions of nuclear reactors embodying the invention are described, by way of example, with reference to the accompanying diagrammatic drawings wherein.

DESCRIPTION OF THE PREFERRED EMBODIMENTS

Figure 1:
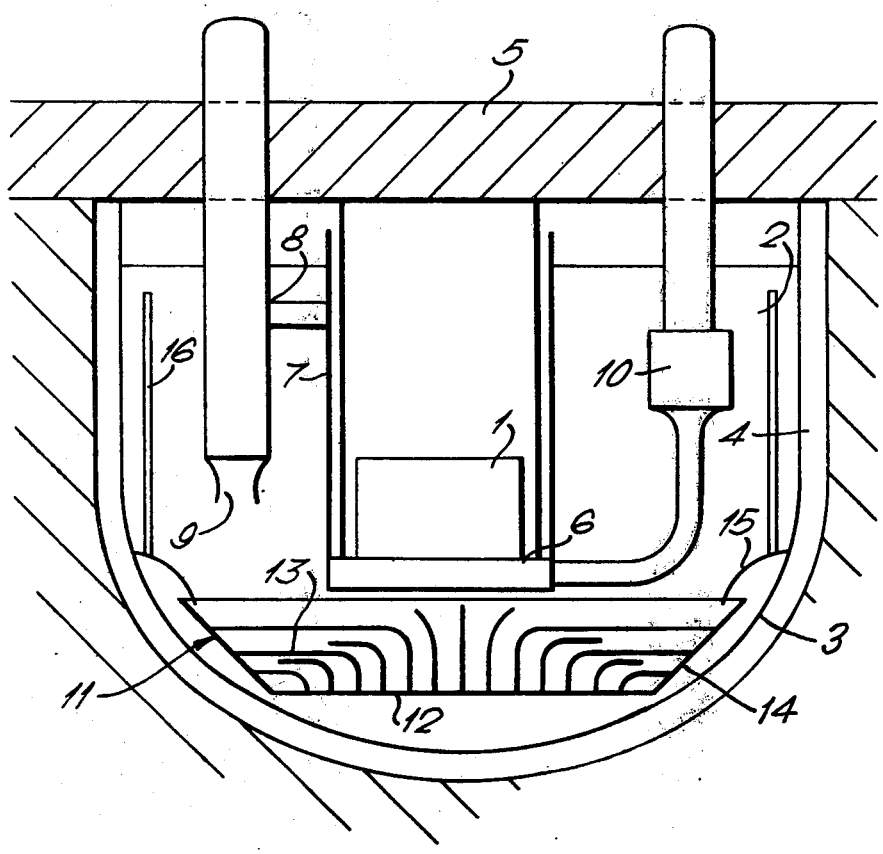
FIG. 1 is a sectional view of one nuclear reactor construction.

The nuclear reactor shown in FIG. 1 is of the liquid sodium cooled fast breeder kind which comprises a mass of nuclear fuel 1 constituting the reactor core submerged in a pool 2 of liquid sodium contained by a vessel 3.

The vessel 3 is suspended within a concrete vault 4 from the roof 5 and the core 1 is supported on a diagrid 6 also suspended from the roof. The core 1 is enclosed by a shroud 7 which is connected to a heat exchanger inlet 8, the heat exchanger outlet 9 discharging into the pool. A sodium pump 10 which draws sodium from the pool 2 is connected to the diagrid 6 so that, in use of the nuclear reactor, sodium coolant is pumped from the pool to the diagrid upwardly through the core 1 thence through the shroud 7 to the heat exchanger inlet 8 and back to the pool. A collecting tray for molten nuclear fuel according to the invention is designated 11 and comprises a base plate 12 forming a plane tube sheet in which one end of each tube of a complex of cooling tubes 13 is received. A peripheral wall 14 of the tray forms an annular tube sheet in which the other open end of each tube of the complex is received. The tube connections with the plane tube sheet are arranged on concentric pitch circles and the tube connections with the annular tube sheet are arranged in layers thereby to effect a regular distribution of cooling tubes throughout the tray so that in the event of a melt down of the core the molten mass is cooled substantially uniformly by sodium flowing through the tubes by natural convection.

The perimeter of the tray extends almost to the wall of the vessel which carries an internal skirt 15 arranged to overlap the perimeter of the collecting tray so that fuel debris carried upwardly by coolant flow through the shroud thence to the outer regions of the pool is directed into the tray instead of on the floor of the vessel. Thermal syphoning pipes 16 penetrate the skirt 15 and extend to the upper regions of the pool of liquid sodium to enable coolant below the skirt and tray to flow into upper regions of the pool coolant.

Figure 2:
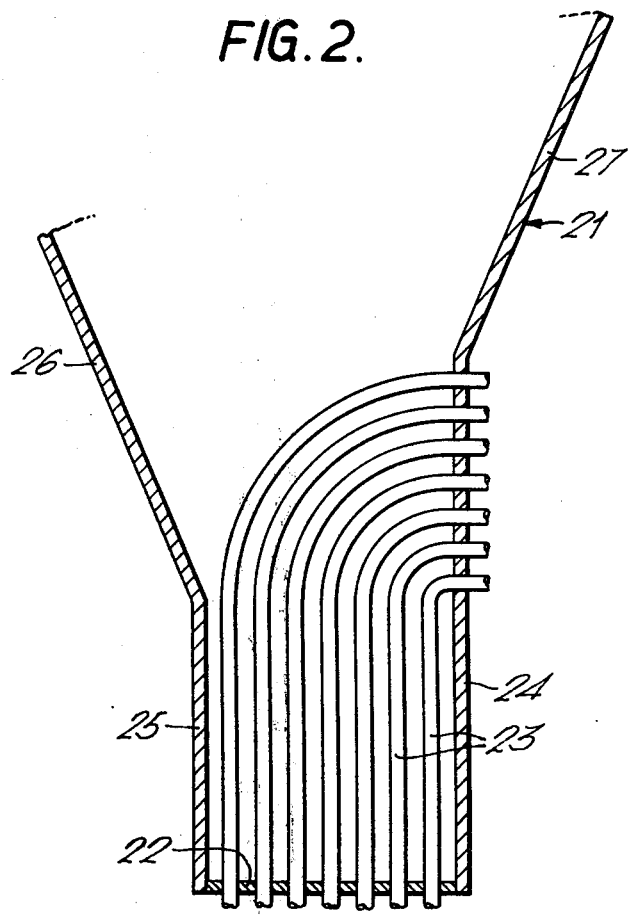
FIG. 2 is a sectional view of an alternative feature for a second construction.

In a second construction of nuclear reactor generally similar to the first described construction the collecting tray 21 is as shown in FIG. 2 and provides for increased coolant flow natural head and increases the local heat transfer coefficient. The tray comprises an annular base plate 22 forming a plane tube sheet in which one open end of each tube 23 of a complex of cooling tubes is received. A peripheral vertical wall 24 forms an annular tube sheet in which the other open end of each tube of the complex is received. The tube connections with the plane tube sheet are arranged on concentric pitch circles and the tube connections with the annular tube sheet are arranged in layers thereby to effect a regular distribution of cooling tubes throughout the tray. The base plate 22 has an inner, annular, vertical wall 25 surmounted by a conical portion 26 having apex disposed on the vertical axis of the reactor core. The wall of the conical portion 26 and an upper wall extension 27 of the wall 24 are inclined at an angle greater than the angle of repose of the fuel (for example, uranium oxide) in sodium so that debris from the core is directed into the wall formed by the inner and peripheral walls of the tray.

A basic feature of the second construction is that a layer of low temperature solid fuel (which could be uranium dioxide) is formed on the base plate to a height determined by the redundancy requirements of the cooling tubes and then a limitless amount of molten fuel can be allowed to collect on top of this solid layer without affecting the temperature gradient through the base plate.

The described constructions of nuclear reactors have advantage in that, in the event of an emergency, the devices for collecting molten fuel debris are completely passive, circulation of coolant being by natural convection. By interrupting the mass of fuel debris by the cooling pipes nuclear criticality of the mass is also reduced. Except for a small quantity of finely divided fuel debris which can be supported by the low velocities inherent with natural convection circulation, all the debris borne by the coolant is diverted into the collecting tray.

I claim:

1. A nuclear reactor construction comprising a vessel containing a pool of liquid coolant, a reactor core submerged in the pool of coolant, a collecting tray for core debris submerged in the pool of coolant below the core and spaced from the floor of the vessel,
   an internal skirt attached to the wall of the vessel and overlapping the periphery of the tray to direct core debris into the tray;
   the collecting tray comprising a complex of cooling tubes extending between a base plate of the tray and a peripheral wall of the tray, the base plate forming a plane tube sheet in which one open end of each cooling tube is received and the peripheral wall forming an annular tube sheet in which the other open end of each cooling tube is received, the tube connections with the plane tube sheet being arranged on concentric pitch circles and the tube connections with the annular tube sheet being arranged in layers thereby to effect a regular distribution of cooling tubes throughout the tray.

2. A nuclear reactor construction according to claim 1 wherein the base plate of the collecting tray is annular and has
   a vertical inner annular wall,
   a conical portion surmounting the inner wall and disposed with axis on the vertical axis of the reactor core, and
   an outwardly directed inclined upper extension of the peripheral wall.

* * * * *